(12) United States Patent
Janjic et al.

(10) Patent No.: US 12,510,098 B2
(45) Date of Patent: Dec. 30, 2025

(54) LANTERNS WITH ELEMENTS FOR HEAT DISCHARGE

(71) Applicant: KSB SE & Co. KGaA, Frankenthal (DE)

(72) Inventors: Boris Janjic, Frankenthal (DE); Sebastian Lang, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 5 days.

(21) Appl. No.: 18/267,511

(22) PCT Filed: Nov. 16, 2021

(86) PCT No.: PCT/EP2021/081783
§ 371 (c)(1),
(2) Date: Jun. 15, 2023

(87) PCT Pub. No.: WO2022/128287
PCT Pub. Date: Jun. 23, 2022

(65) Prior Publication Data
US 2024/0044342 A1    Feb. 8, 2024

(30) Foreign Application Priority Data
Dec. 16, 2020    (DE) .................... 10 2020 133 832.5

(51) Int. Cl.
*F04D 29/58* (2006.01)
(52) U.S. Cl.
CPC .. *F04D 29/5893* (2013.01); *F05D 2260/2214* (2013.01)

(58) Field of Classification Search
CPC ............... F05D 2260/2214; F04D 29/58–5893
See application file for complete search history.

(56) References Cited

U.S. PATENT DOCUMENTS

| | | | | |
|---|---|---|---|---|
| 1,136,928 A | * | 4/1915 | Bodinson | F04D 29/047 415/214.1 |
| 2,737,120 A | * | 3/1956 | Ivanoff | H02K 5/1285 122/406.1 |
| 4,114,899 A | * | 9/1978 | Kulzer | F16J 15/162 277/408 |
| 4,172,697 A | * | 10/1979 | Schoen | H02K 9/06 417/372 |

(Continued)

FOREIGN PATENT DOCUMENTS

| | | |
|---|---|---|
| DE | 19 64 474 A | 7/1967 |
| DE | 25 45 278 A1 | 4/1976 |

(Continued)

OTHER PUBLICATIONS

International Search Report (PCT/ISA/210) issued in PCT Application No. PCT/EP2021/081783 dated Feb. 28, 2022 with English translation (5 pages).

(Continued)

*Primary Examiner* — Sang K Kim
(74) *Attorney, Agent, or Firm* — Crowell & Moring LLP (57) ABSTRACT

A pump assembly such as a centrifugal pump assembly includes a lantern arranged between a pump housing and a motor housing. Surface enlarging elements are arranged at the lantern for increasing heat dissipation and/or enhancing cooling air flow.

12 Claims, 7 Drawing Sheets

(56) References Cited

U.S. PATENT DOCUMENTS

| | | | | |
|---|---|---|---|---|
| 4,720,248 A * | 1/1988 | Dernedde | ........... | F04D 29/5893 |
| | | | | 417/373 |
| 4,979,875 A | 12/1990 | Mueller et al. | | |
| 8,152,458 B2 * | 4/2012 | Buell | .................... | F04D 29/043 |
| | | | | 417/373 |
| 9,562,533 B2 * | 2/2017 | Johchi | ..................... | F04D 13/08 |
| 10,072,667 B2 * | 9/2018 | An | ......................... | F04D 25/024 |
| 2023/0387751 A1* | 11/2023 | Schunk | .................. | H02K 7/083 |
| 2024/0309887 A1* | 9/2024 | Janjic | .................. | F04D 13/0686 |

FOREIGN PATENT DOCUMENTS

| | | |
|---|---|---|
| DE | 30 16 681 A1 | 11/1981 |
| DE | 86 27 766 U1 | 3/1988 |
| DE | 39 17 811 A1 | 12/1990 |
| DE | 101 20 409 A1 | 11/2002 |
| DE | 10 2017 209 803 A1 | 12/2018 |
| EP | 1 038 611 A2 | 9/2000 |

OTHER PUBLICATIONS

German-language Written Opinion (PCT/ISA/237) issued in PCT Application No. PCT/EP2021/081783 dated Feb. 28, 2022 (6 pages).
German-language Search Report issued in German Application No. 10 2020 133 832.5 dated Oct. 12, 2021 with partial English translation (12 pages).

* cited by examiner

Fig. 1

PRIOR ART

LANTERNS WITH ELEMENTS FOR HEAT DISCHARGE

CROSS REFERENCE TO RELATED APPLICATION

This application claims priority under 35 U.S.C. § 119 from German Patent Application No. 102020133832.5, filed Dec. 16, 2020, the entire disclosure of which is herein expressly incorporated by reference.

BACKGROUND AND SUMMARY OF THE INVENTION

The invention relates to a pump arrangement with a lantern which is arranged between a pump casing and a motor casing.

Such a pump arrangement can be, for example, a centrifugal pump arrangement. Centrifugal pumps are based on the working principle of transferring energy to a fluid by changing the swirl as a consequence of a torque which is produced by a uniformly rotating impeller on the fluid flowing through the latter.

Centrifugal pumps are usually driven by electric motors. As well as this electric drive, piston engines are also used in centrifugal pump technology as the driving means. Electric motors generate a uniform torque. The electric motor is an electromechanical energy converter which converts electrical energy into mechanical energy. Depending on in what form the electrical energy is available, direct-current motors, alternating-current motors, or three-phase motors are used. The electrical energy is here generally converted into a rotational movement.

The electric motor driving a centrifugal pump is usually connected to the pump via a lantern with a certain spacing. The motor driveshaft here traverses the center of openings in the two flanges or covers for fastening to the motor and to the pump casing. Lanterns are usually produced by casting.

Such a lantern and a corresponding production method are described, for example, in EP 1 038 611 A2. The type and number of the described connecting lugs enable a particularly stable design of a lantern.

In the case of pump arrangements which are used to deliver fluids, at high temperatures, heat can be emitted from the pump casing in the direction of the electric motor. This can cause numerous problems at the electric motor. High temperatures reduce the efficiency of the energy conversion. The components of the motor, in particular the windings of the stator and the rotor, are thermally stressed, as a result of which their lifetime can be shortened. The magnets of the rotor can additionally be damaged. In the case of pump arrangements with integrated power electronics, heating of the electronic components is particularly critical. For these reasons, the electric motor control system sometimes has to reduce the power consumption and the speed in order to prevent overheating of the electric motor and/or the power electronics, as a result of which the pump can no longer work within the desired operating range.

Attempts are usually made to implement a large spacing between the hot pump casing and the electric motor using particularly long lanterns in order to avoid the problems described. A large spacing also means a large dimension of the pump arrangement which can then no longer be installed at every deployment location. A large spacing furthermore also entails a long driveshaft which requires suitable mounting in order to be able to absorb the imbalance which occurs during the operating time. Increased vibration of the whole system can result.

The object of the invention is to provide a lantern as a connecting element between a pump casing and a drive motor. It is intended that this connecting element can discharge as effectively as possible the heat which is emitted by the pump casing when delivering hot fluids and conduct it only minimally in the direction of the motor or/and power electronics. It is moreover intended that the connecting element is distinguished by a compact structure. Changing replacement parts should be favored by the construction of the connecting element. The connecting element should be capable of being implemented simply and cost-effectively.

This object is achieved according to the invention by a pump arrangement with a lantern. Preferred variants can be found in the dependent claims, the description, and the drawings.

According to the invention, surface-enlarging elements for dissipating heat are arranged on a lantern of a pump arrangement which is arranged between a pump casing and a motor casing. The surface-enlarging elements are ideally designed as cooling ribs in order to optimize the heat dissipation of the lantern. The cooling ribs have a plate-shaped and/or trapezoidal and/or triangular and/or curved and/or annular design. By virtue of the optimized heat dissipation of the lantern, the pump casing, which can have high temperatures because hot fluids are delivered, and the motor casing are virtually thermally uncoupled.

The optimization of the heat dissipation of the lantern is obtained by the advantageous construction of the lantern. The fan of the motor arrangement generates a stream of cooling air which cools the ribs of the motor casing and then flows over the lantern. The lantern is here constructed such that the internal diameter remains constant and the external diameter is widened over the length of the lantern base body. In this particularly advantageous fashion, the stream of cooling air flows over the cooling ribs of the lantern and efficiently dissipates the heat. At the same time, the construction of the lantern diverts the stream of cooling air away over the pump casing such that the flow onto the pump casing represents a reduced flow resistance.

In a variant of the invention, the external diameter of the lantern base body is widened on the pump side, as a result of which the flow regime of the stream of cooling air which is generated by the motor fan is improved. A smaller flow resistance means a higher flow rate which in turn favors improved heat dissipation of the motor casing and the lantern.

According to a variant of the invention, the lantern has a rotationally symmetrical design. The symmetrical construction of the lantern favors the flow-optimized guidance of the stream of cooling air and intensifies the heat dissipation of the lantern. The thermal uncoupling of the pump casing from the motor casing is advantageously assisted by the symmetrical configuration of the lantern.

In a variant of the invention, the surface-enlarging elements, which are configured as cooling ribs, are arranged on a hollow cylindrical base body of the lantern.

The shell surface of the lantern preferably has openings which are preferably configured as windows. They can be used for mounting purposes, for accessing the shaft, and/or for the inflow of cooling air and/or for increasing the thermal resistance of the lantern.

The lantern advantageously directly connects the pump casing and the motor casing. In principle, no further component is required to produce this connection. A reduction in the number of components is usually advantageous for reducing the production costs.

In a variant of the invention, the lantern is configured with multiple parts. This can be effected, for example, with removable blades and/or cooling ribs and/or by a divided configuration of the lantern. Furthermore, a solution with different sleeves which can be pushed one over the other is also conceivable, wherein cooling ribs are arranged on an outer side of a sleeve.

According to the invention, the thermal conductivity of the lantern material is less than 40 W/m-K, preferably less than 20 W/m-K, in particular less than 10 W/m-K.

The lantern preferably consists of gray cast iron or aluminum or stainless steel.

The lantern can be produced by means of casting methods or 3D printing.

The thermal conductivity of the cooling ribs is ideally more than 150 W/m-K, in particular more than 200 W/m-K, preferably more than 250 W/m-K.

The surface-enlarging elements are designed in particular as guide elements for guiding a stream of cooling air. The flow-optimized guidance of the stream of cooling air increases the heat dissipation of the lantern, said heat being conducted from the pump casing into the lantern.

According to an embodiment of the invention, the surface-enlarging elements are oriented axially. The axial orientation of the cooling ribs favors the overflowing of the stream of cooling air with a reduced flow resistance and results in a particularly ideal heat dissipation of the lantern.

In a variant of the invention, the surface-enlarging elements are advantageously oriented radially. This orientation effects flow-optimized diverting of the stream of cooling air away over the pump casing and at the same time enables heat dissipation of the lantern. Thermal uncoupling of the pump casing and the motor casing is preferably obtained as a result.

The lantern ideally has elements for enlarging the surface. These elements can be configured in the form of cooling ribs. The thermal uncoupling of the pump casing from the motor casing is favored by the enlarging of the surface of the lantern. The surface-enlarging elements here have a plate-shaped and/or trapezoidal and/or triangular and/or curved and/or annular design in the form of cooling ribs.

The lantern preferably has a cylindrical design or one in the shape of the bell of a trumpet. This spatial design is particularly advantageous for obtaining additional cooling of the lantern by the stream of cooling air which is generated by the motor fan. In an alternative variant of the invention, the lantern can also have a conical and/or cuboid design.

In a variant of the invention, the lantern is designed such that it is integral with the motor-side pressure cover of the pump casing and/or integral with the pump-side motor cover. The lantern can thus advantageously be configured to be particularly compact and enables a pump arrangement with dimensions which enable it to be used even in deployment locations with limited space conditions.

According to the invention, the lantern is designed on the pump side and/or the motor side as a bearing carrier. This results in a particularly compact structure of the lantern and at the same time in a reduced mounting cost by lowering the number of parts.

Cutouts in the form of windows for the inlet of the stream of cooling air into the inside of the lantern for the purpose of cooling the shaft can advantageously be arranged in the lantern.

Further features and advantages of the invention can be found in the description of exemplary embodiments with the aid of the drawings and in the drawings themselves.

DETAILED DESCRIPTION

Figure 1:
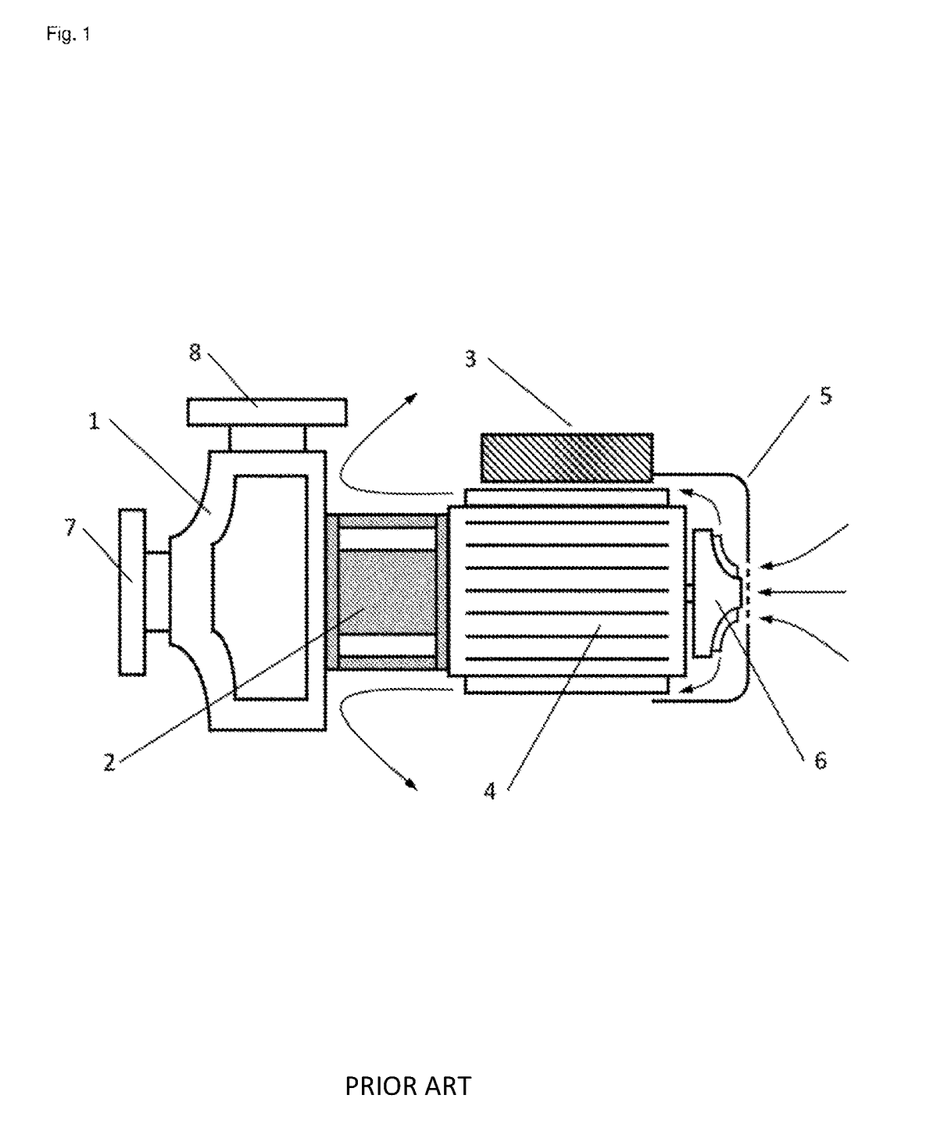
FIG. 1 shows a schematic illustration of a centrifugal pump unit according to the prior art.

FIG. 1 shows a schematic illustration of a centrifugal pump unit according to the prior art. A lantern 2 is arranged between a pump casing 1 and a motor casing 4 and interconnects them. The centrifugal pump illustrated in the exemplary embodiment is used to deliver fluids which can in some circumstances have high temperatures.

The fluid enters the pump casing 1 of the centrifugal pump through an intake port 7. The impeller is arranged inside the pump casing 3. The impeller transmits kinetic energy to the fluid which leaves the centrifugal pump via the discharge port 8. The space filled with fluid and the impeller is delimited by a pump casing 1 and a casing cover. The impeller is connected non-rotatably to a shaft which drives the impeller by means of a motor arrangement. The motor arrangement comprises the motor electronics 3, a rotor, a stator, the shaft, a pump-side motor cover, and a motor casing 4. A bearing carrier, which carries a bearing, is arranged in the motor cover.

A fan impeller 6 arranged on the shaft draws a stream of cooling air axially through the fan casing 5 in order to flow over the motor casing 4 and flow through the space between the motor casing 4 and the motor electronics 3. The stream of cooling air illustrated by arrows in FIG. 1 flows over the lantern 2 and strikes the pump casing 1. As a result, the flow regime of the stream of cooling air is negatively influenced and the discharge of heat is reduced.

Figure 2:
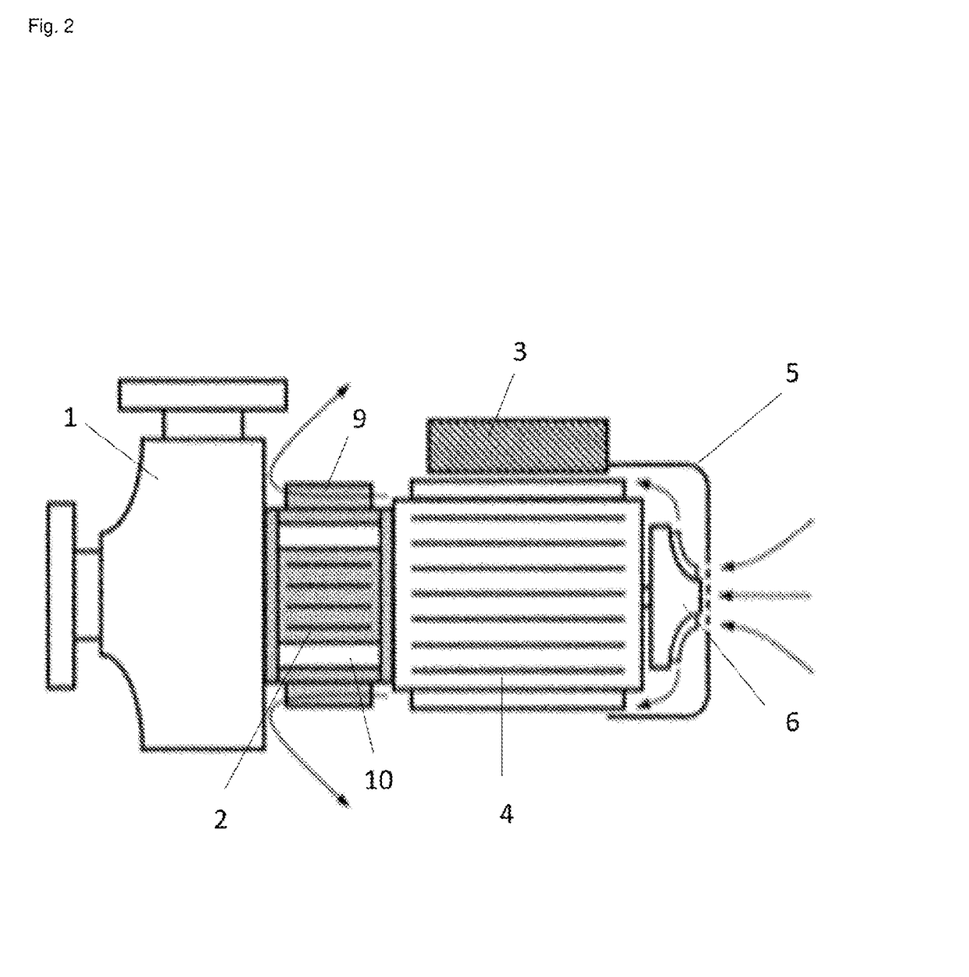
FIG. 2 shows a schematic illustration of a centrifugal pump unit with surface-enlarging elements in accordance with an embodiment of the present invention.

FIG. 2 shows a schematic illustration of a centrifugal pump unit with surface-enlarging elements 9. The surface-enlarging elements 9 are designed as cooling ribs in this exemplary embodiment of the invention. The cooling ribs extend axially over the length of the base body of the lantern 2 and are arranged on the outside of the hollow cylindrical lantern 2. According to the invention, the width of the axial cooling ribs is more than 1 mm, preferably more than 2 mm, in particular more than 3 mm, and/or less than 14 mm, preferably less than 12 mm, in particular less than 10 mm. The height of the axial cooling ribs is more than 3 mm, preferably more than 5 mm, in particular more than 7 mm, and/or less than 50 mm, preferably less than 45 mm, in particular less than 40 mm.

In this exemplary embodiment, the thermal conductivity of the lantern material is less than 40 W/m-K, preferably less than 20 W/m-K, in particular less than 10 W/m-K, and the thermal conductivity of the cooling ribs is more than 150 W/m-K, in particular more than 200 W/m-K, preferably more than 250 W/m-K. The base body of the lantern 2 preferably consists of gray cast iron or stainless steel.

According to the invention, the surface-enlarging elements 9 are oriented axially. The axial orientation of the cooling ribs favors the flow over them of the stream of cooling air, indicated by arrows in the Figure, in the case of a reduced flow resistance and results in a particularly ideal heat dissipation of the lantern 2.

Cutouts 10 in the form of windows for the inlet of the stream of cooling air into the inside of the lantern for the purpose of cooling the shaft are furthermore arranged in the lantern 2.

Figure 3:
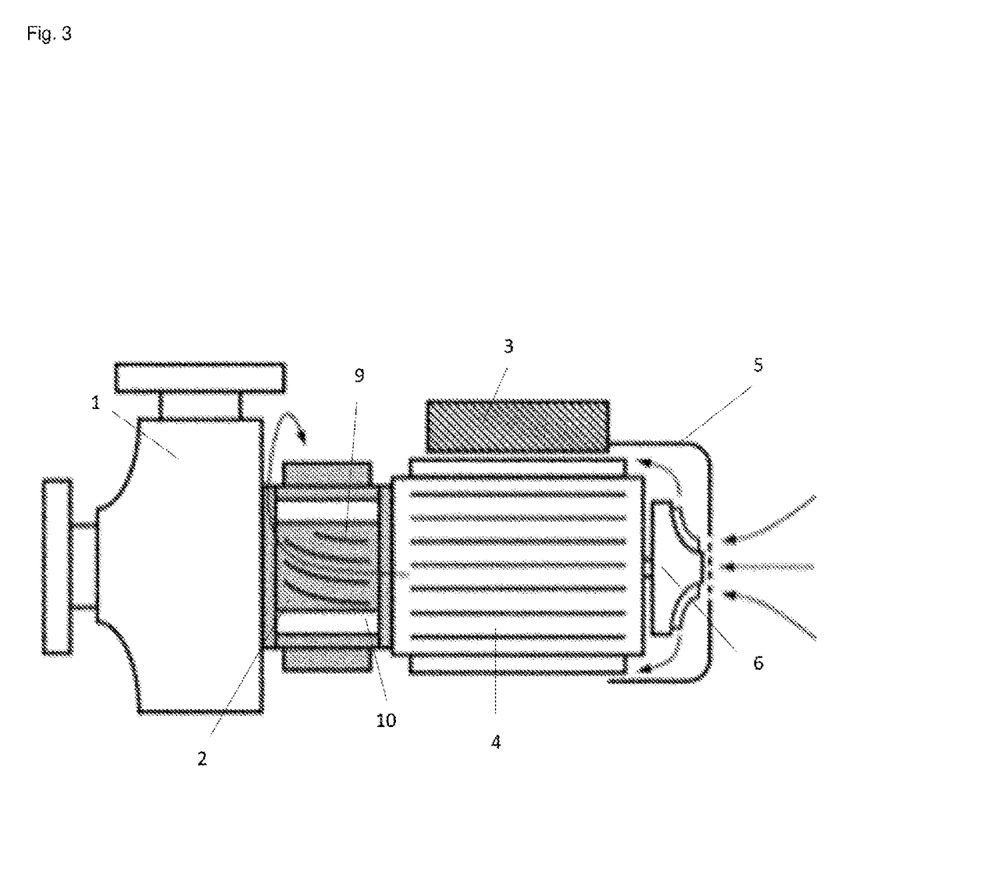
FIG. 3 shows a schematic illustration of a centrifugal pump unit with surface-enlarging curved elements in accordance with an embodiment of the present invention.

FIG. 3 shows a schematic illustration of a centrifugal pump unit with surface-enlarging curved elements 9. A plurality of surface-enlarging elements 9, which are designed as curved or arched cooling ribs in this exemplary embodiment, are arranged on the base body of the lantern 2. The dimensions of the cooling ribs correspond to those in FIG. 2. The stream of cooling air generated by the fan impeller 6 flows over the cooling ribs of the motor casing 4 and then the cooling ribs of the lantern 2. By virtue of the curved shape of the cooling ribs of the lantern 2, the stream of cooling air experiences a deflection illustrated by arrows in FIG. 3 and does not strike the pump casing 1 at right angles. As a result, the flow regime of the stream of cooling air as a whole is improved and the heat discharge capacity of the lantern 2 and of the motor casing 4 increased.

Figure 4:
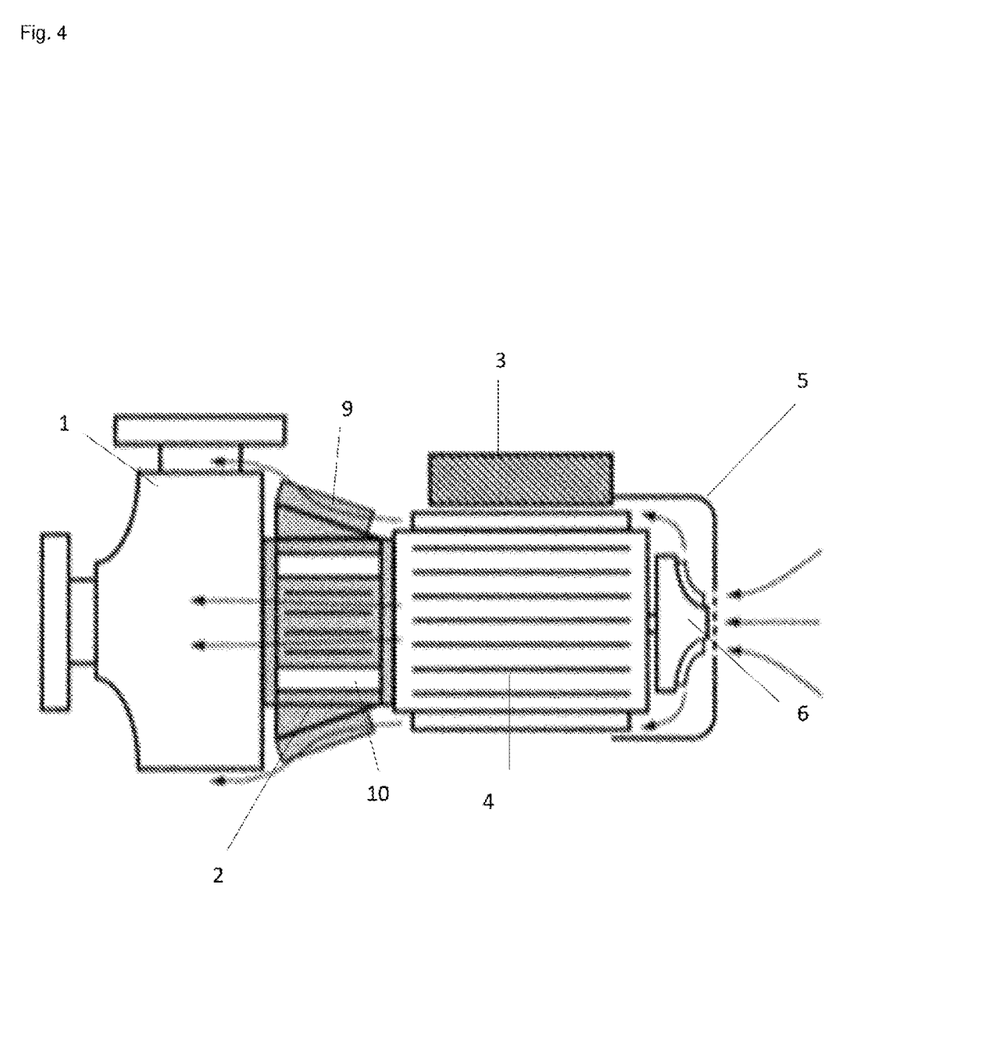
FIG. 4 shows a schematic illustration of a centrifugal pump unit with a lantern in the shape of the bell of a trumpet and surface-enlarging elements in accordance with an embodiment of the present invention.

FIG. 4 shows a schematic illustration of a centrifugal pump unit with a lantern 2 in the shape of a bell of a trumpet and surface-enlarging elements 9. The shape of a bell of a trumpet of the exemplary embodiment of the lantern 2 is particularly flow-optimized in terms of the stream of cooling air which is generated by the fan impeller 6. The stream of cooling air illustrated in FIG. 4 does not strike the pump casing 1 at right angles and instead is guided over the pump casing 1 by the trumpet bell shape of the lantern 2. The flow optimization results in a higher flow rate of the stream of cooling air, as a result of which the heat dissipation of the surface-enlarging elements 9 arranged axially on the lantern 2 is also improved. At the same time, the heat-discharge surface of the lantern 2 is enlarged, as a result of which the heat discharge capacity is further increased.

In a variant of the invention, the lantern 2 in the shape of the bell of a trumpet can also have an asymmetrical design in order to form the flow over an asymmetrically formed pump casing 1 in an ideal fashion. The shape of the lantern 2 is here adapted to the shape of the pump casing 1.

Figure 5:
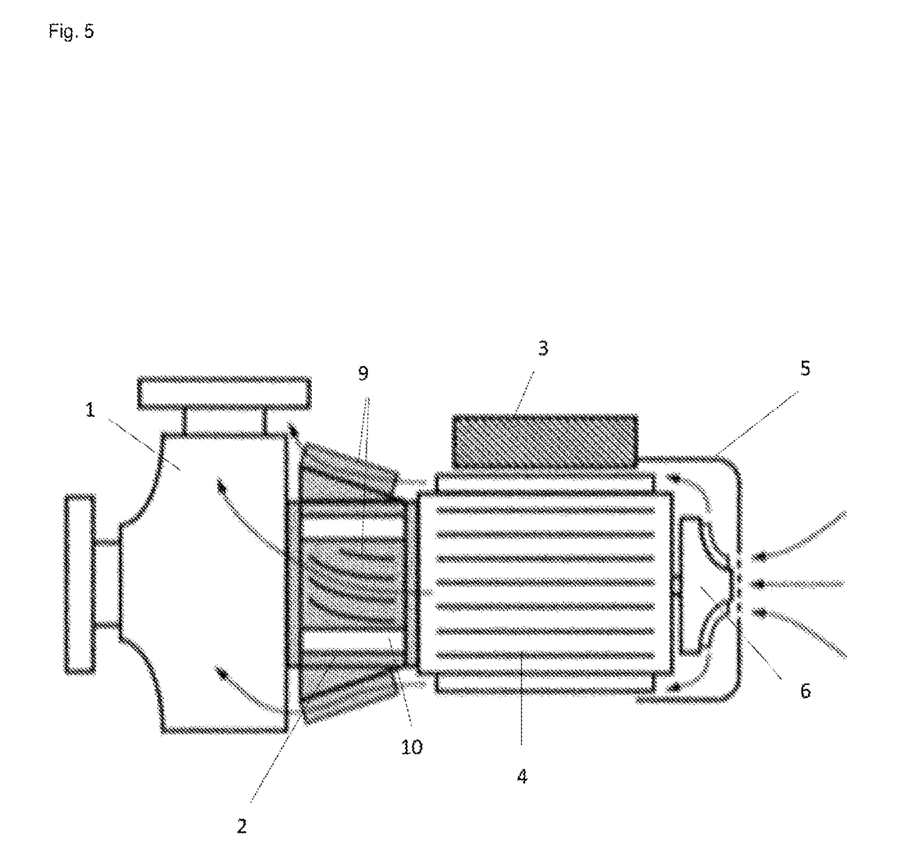
FIG. 5 shows a schematic illustration of a centrifugal pump unit with a lantern in the shape of the bell of a trumpet and surface-enlarging curved elements in accordance with an embodiment of the present invention.

FIG. 5 shows a schematic illustration of a centrifugal pump unit with a lantern 2 in the shape of the bell of a trumpet and surface-enlarging curved elements 9. The lantern 2 illustrated in this exemplary embodiment corresponds to a large extent to the lantern 2 in FIG. 4. In addition, the surface-enlarging elements 9 are designed in the form of curved cooling ribs. As a result, the stream of cooling air indicated by arrows is guided over the pump casing 1 and at the same time generates a swirl which improves the heat discharge capacity.

Figure 6:
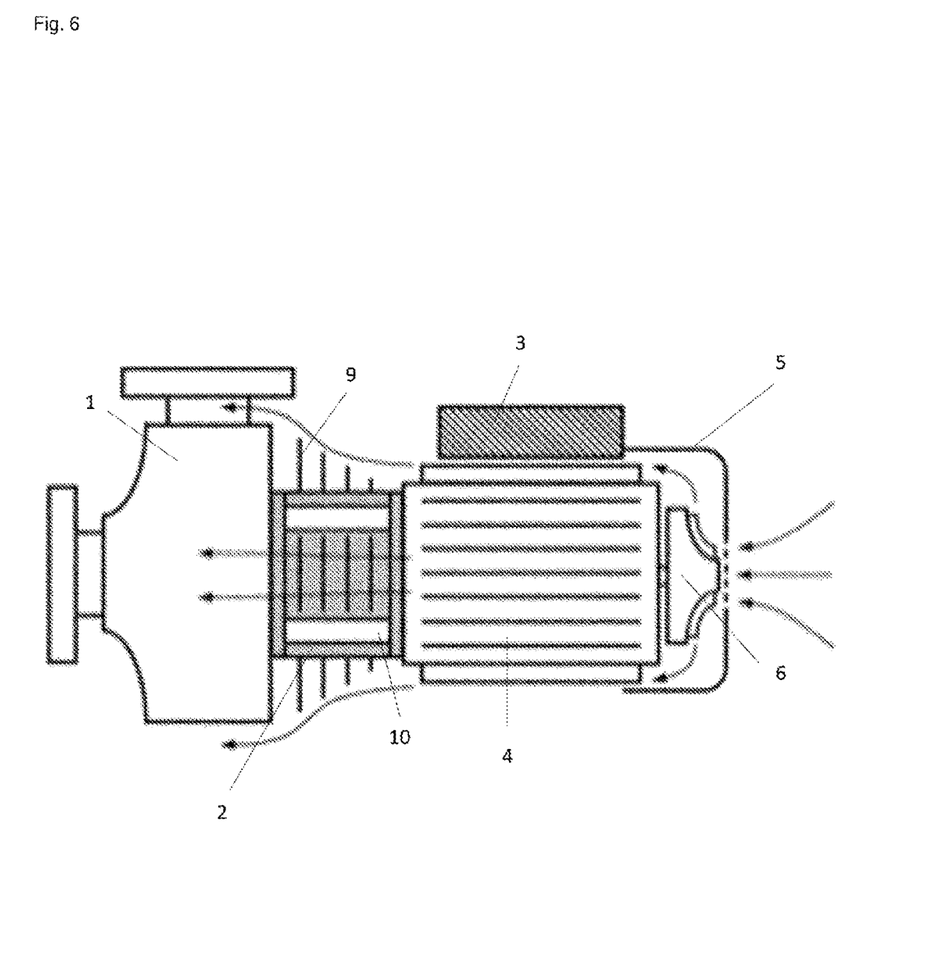
FIG. 6 shows a schematic illustration of a centrifugal pump unit with radially oriented surface-enlarging elements in accordance with an embodiment of the present invention.

FIG. 6 shows a schematic illustration of a centrifugal pump unit with a lantern 2, the surface-enlarging elements 9 of which are oriented radially. The lantern 2 has a plurality of radially arranged surface-enlarging elements 9 which are designed as radial cooling rib rings in this exemplary embodiment. The base body of the lantern 2 in FIG. 6 corresponds to the lantern 2 in FIG. 2. Thus, in this exemplary embodiment, four cooling rib rings are additionally arranged on the hollow cylindrical base body. The cooling ribs rings have a different height which rises in the direction of the pump casing 1 in a fashion such that the lantern 2 receives a frustoconical form as a result of the cooling rib rings.

According to the invention, the width of the cooling rib rings is more than 1 mm, preferably more than 2 mm, in particular more than 3 mm, and/or less than 14 mm, preferably less than 12 mm, in particular less than 10 mm. The height of the smallest cooling rib ring is here more than 3 mm, preferably more than 5 mm, in particular more than 7 mm, and/or less than 30 mm, preferably less than 25 mm, in particular less than 20 mm. At the same time, the height of the largest cooling rib ring is more than 20 mm, preferably more than 25 mm, in particular more than 30 mm, and/or less than 100 mm, preferably less than 90 mm, in particular less than 80 mm.

According to the invention, the cooling rib rings are arranged perpendicularly on the lantern 2 with the same spacing and the height of the cooling rib rings here widens symmetrically in the direction of the pump casing 1. In an alternative variant of the invention, the arrangement of the cooling rib rings is not with the same spacing relative to one another and/or the orientation is not at right angles to the lantern 1. The orientation of the cooling rib rings can here assume a flow-optimized angle.

The material thickness of the lantern 2 is more than 1 mm, preferably more than 2 mm, in particular more than 3 mm, and/or less than 14 mm, preferably less than 12 mm, in particular less than 10 mm.

In an exemplary embodiment of the invention, the cooling rib rings can be arranged on a sleeve which is attached over the hollow cylindrical base body of the lantern 2.

The surface-enlarging elements 9 are advantageously oriented radially in the form of cooling rib rings. This orientation effects flow-optimized diverting of the stream of cooling air away over the pump casing 1 and at the same time enables efficient heat dissipation of the lantern 2 by the formation of a vortex at the individual cooling rings. As a result, thermal uncoupling of the pump casing and the motor casing is preferably obtained.

Figure 7:
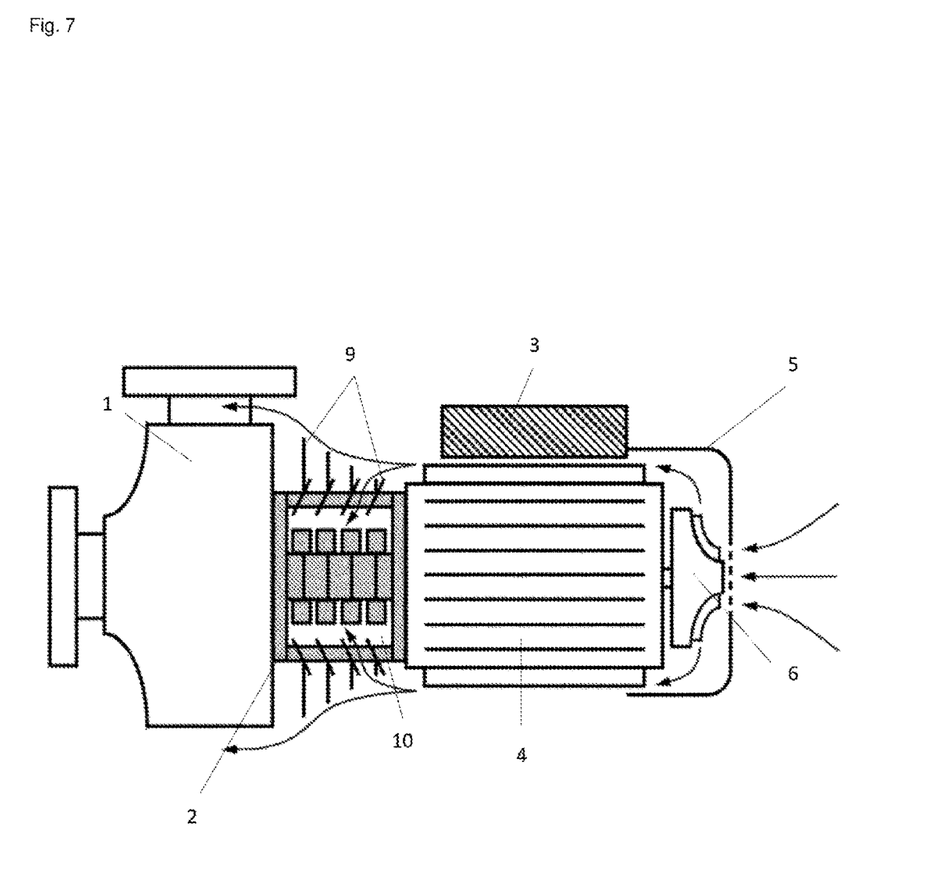
FIG. 7 shows a schematic illustration of a centrifugal pump unit with a further configuration of the surface-enlarging elements in accordance with an embodiment of the present invention.

FIG. 7 shows a schematic illustration of a centrifugal pump unit with a further configuration of the surface-enlarging elements 9 which are designed in the form of radially oriented cooling rings. Inlet ducts in all cases offset by 90° here guide the stream of cooling air through the windows 10 of the lantern 2 into the inside the lantern in order to cool the driveshaft. The cooling rib rings have interruptions in the region of the windows 10 and are designed so that they are not completely rotationally symmetrical.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pump arrangement, comprising:
a pump casing;
a fan impeller;
a motor casing; and
a lantern having a first part that contacts the pump casing and a second part that contacts the motor casing; wherein
the lantern has heat dissipating surface-enlarging elements that extend farther along a radially-outward direction of the lantern than the first and second parts, wherein
the motor casing has cooling ribs which cooperate with the heat dissipating surface-enlarging elements of the lantern in such a way that: i) both the cooling ribs and the heat dissipating surface-enlarging elements each comprise portions that extend at least partially in the same direction, and ii) a stream of cooling air generated by the fan impeller flows successively over the cooling ribs of the motor casing and the heat dissipating surface-enlarging elements of the lantern.

2. The pump arrangement as claimed in claim 1, wherein a lantern internal diameter remains constant and a lantern external diameter is widened over an axial length of a base body of the lantern.

3. The pump arrangement as claimed in claim 2, wherein the lantern external diameter is wider on a pump side of the lantern than on a motor side of the lantern.

4. The pump arrangement as claimed in claim 1, wherein the lantern is rotationally symmetric.

5. The pump arrangement as claimed in claim 1, wherein the heat dissipating surface-enlarging elements are arranged on a base body of the lantern.

6. The pump arrangement as claimed in claim 1, wherein the thermal conductivity of the heat dissipating surface-enlarging elements is more than 150 W/m-K.

7. The pump arrangement as claimed in claim 1, wherein the thermal conductivity of a base body of the lantern is less than 40 W/m-K.

8. The pump arrangement as claimed in claim 5, wherein the heat dissipating surface-enlarging elements are guide elements configured to: i) guide a stream of cooling air over the pump housing, and ii) reduce flow resistance by guiding the stream of cooling air in such a way that it does not strike the pump casing at right angles.

9. The pump arrangement as claimed in claim 8, wherein the heat dissipating surface-enlarging elements are oriented axially.

10. The pump arrangement as claimed in claim 8, wherein the heat dissipating surface-enlarging elements are oriented radially.

11. The pump arrangement as claimed in claim 9, wherein the heat dissipating surface-enlarging elements have at least one of a plate shape, a trapezoidal shape, a curved shape, a triangular shape and an annular shape.

12. The pump arrangement as claimed in claim 10, wherein
the heat dissipating surface-enlarging elements have at least one of a plate shape, a trapezoidal shape, a curved shape, a triangular shape and an annular shape.

* * * * *